United States Patent [19]

Alvarez

[11] 4,301,468
[45] Nov. 17, 1981

[54] COLOR TELEVISION VIEWER

[76] Inventor: Luis W. Alvarez, 131 Southampton Ave., Berkeley, Calif. 94707

[21] Appl. No.: 128,641

[22] Filed: Mar. 10, 1980

Related U.S. Application Data

[63] Continuation-in-part of Ser. No. 56,035, Jul. 9, 1979, abandoned.

[51] Int. Cl.³ .............................................. H04N 9/16
[52] U.S. Cl. ......................................... 358/64; 358/66
[58] Field of Search ...................... 358/11, 60, 66, 64; 455/600, 618; 340/705

[56] References Cited

U.S. PATENT DOCUMENTS

| 2,337,980 | 12/1943 | Du Mont | 358/66 |
|---|---|---|---|
| 2,552,464 | 5/1951 | Siezen | 358/66 |
| 2,587,006 | 2/1952 | Smith | 358/11 |
| 2,600,590 | 6/1952 | Thomas | 358/55 |
| 2,603,706 | 7/1952 | Sleeper | 358/66 |
| 2,953,635 | 9/1960 | de Gier | 358/60 |
| 3,267,207 | 8/1966 | Okazaki | 358/11 |
| 3,598,904 | 8/1971 | Foerster | 358/11 |
| 3,636,246 | 1/1972 | Steiger | 358/11 |
| 3,823,260 | 7/1974 | Van den Bussche | 358/49 |

*Primary Examiner*—Michael A. Masinick
*Attorney, Agent, or Firm*—Limbach, Limbach & Sutton

[57] ABSTRACT

In this hand-held color television viewing device, differently colored, side-by-side rasters are produced on the screen of a cathode ray tube from standard color television signals by the use of three pairs of serial delay lines.

One delay line of each pair stores a horizontal scan line of color video information for a single color signal while the other delay line of each pair, each in succession, outputs the previously stored line in one-third of a line scan period to the control element of the cathode ray tube. The three side-by-side rasters are then optically combined into a single, composite colored, greatly enlarged, virtual image of high brightness.

26 Claims, 10 Drawing Figures

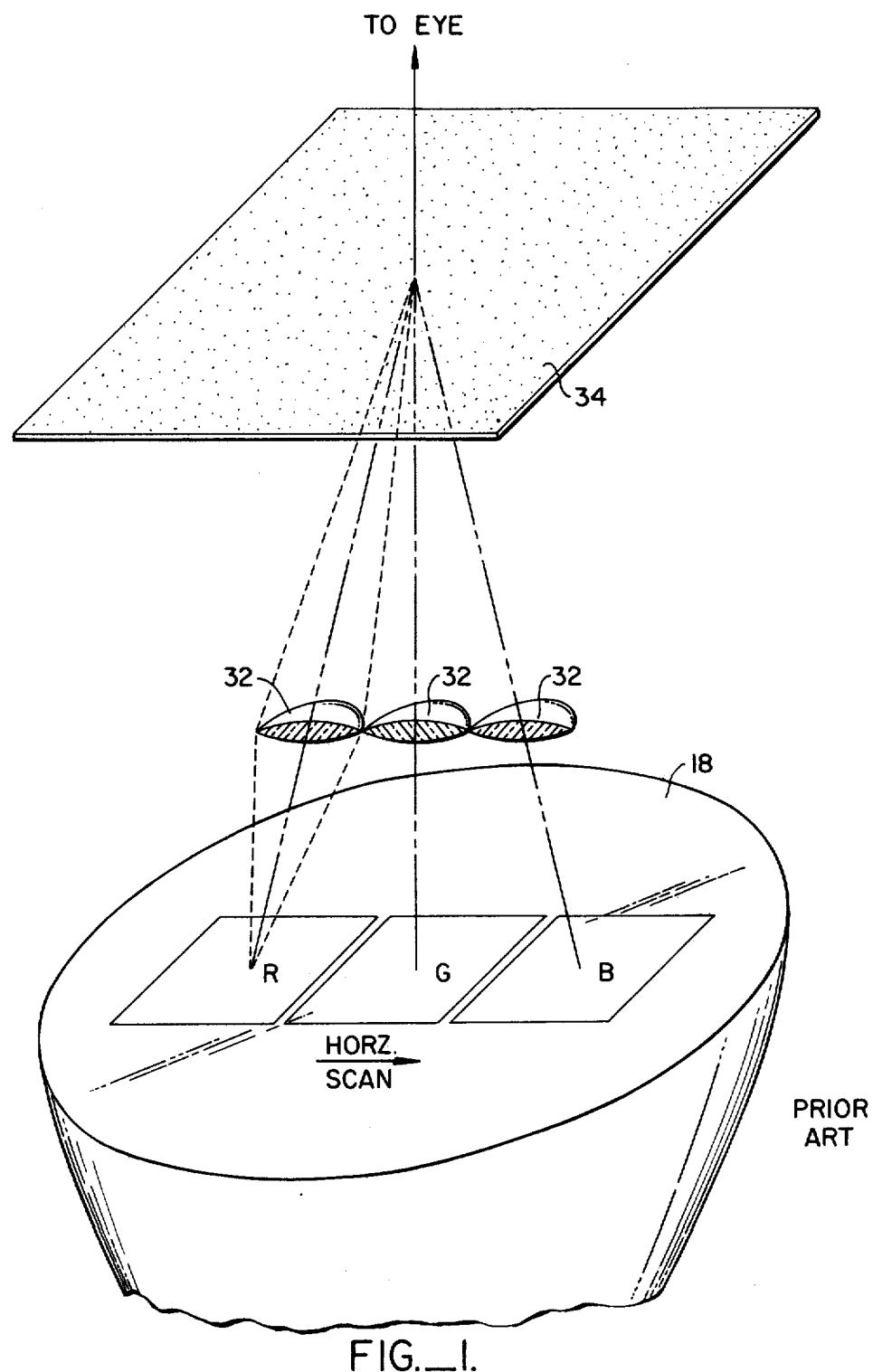
FIG._1.

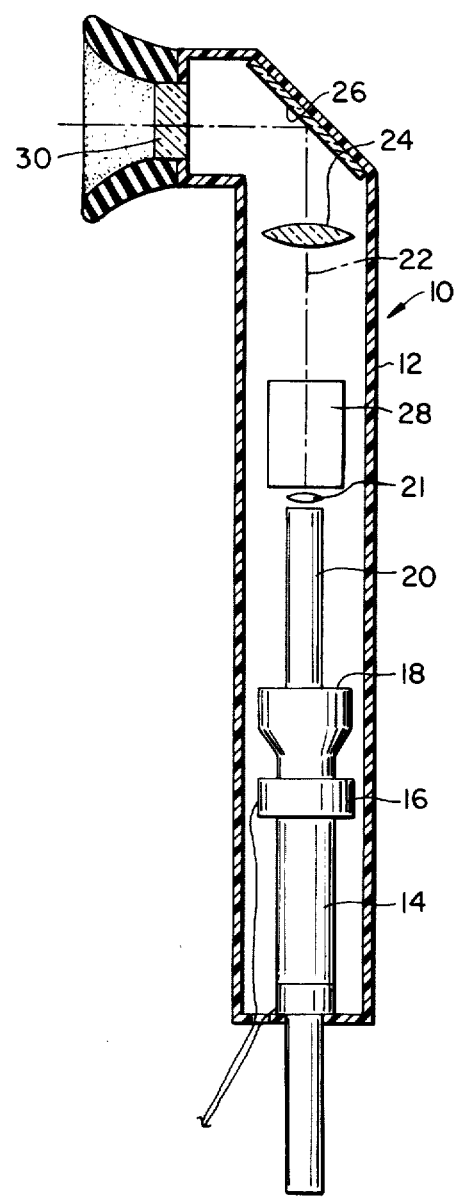
FIG._2.

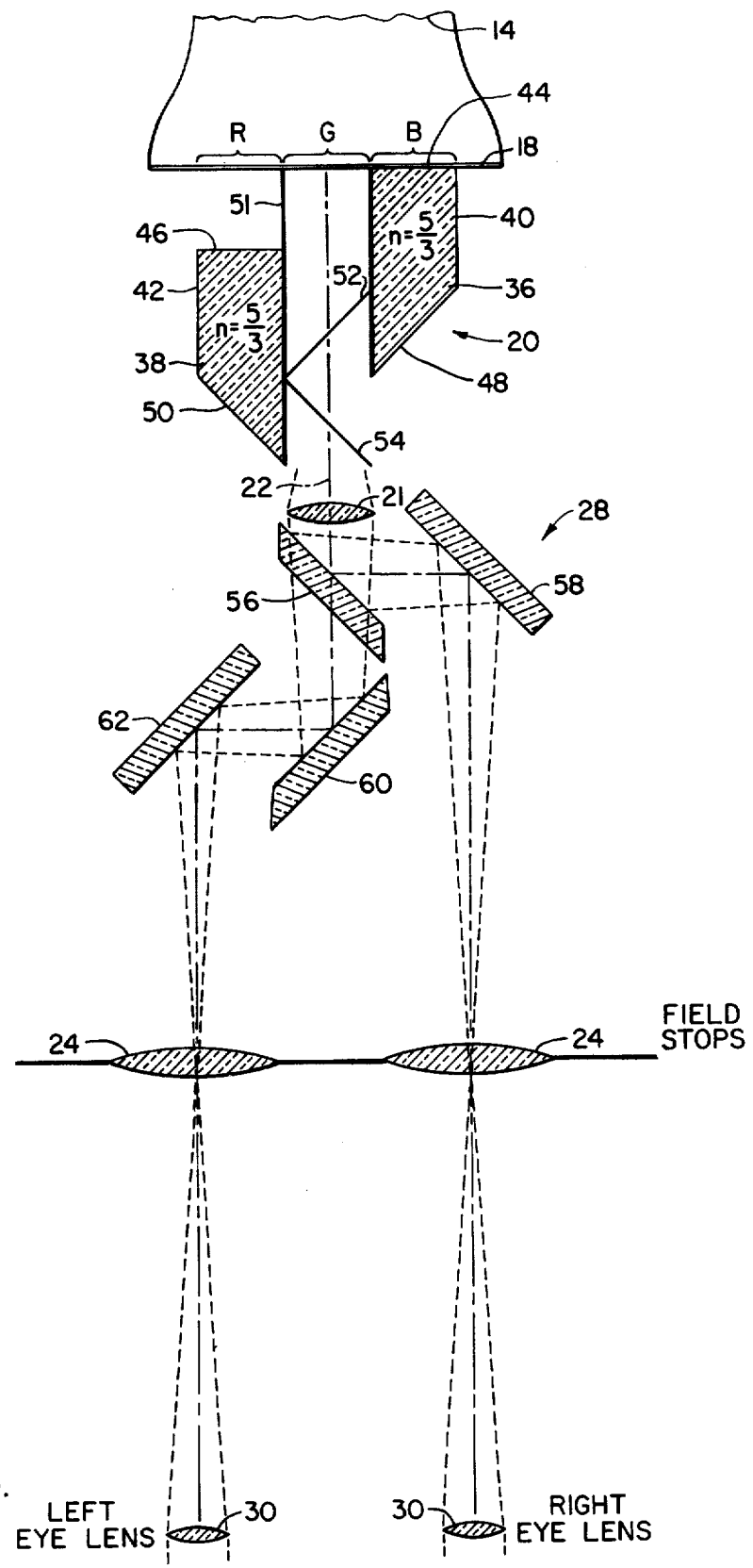
FIG._3.

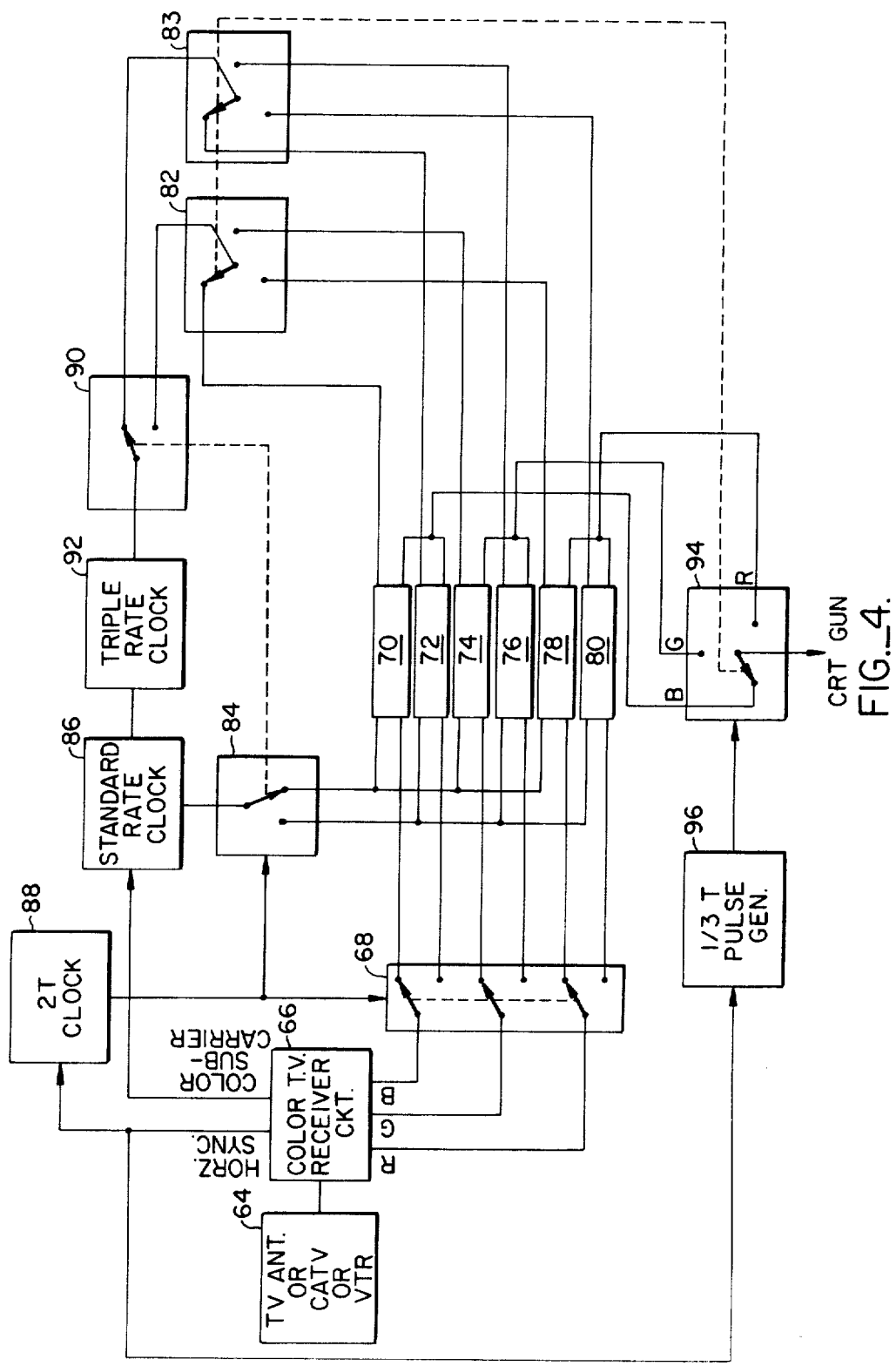

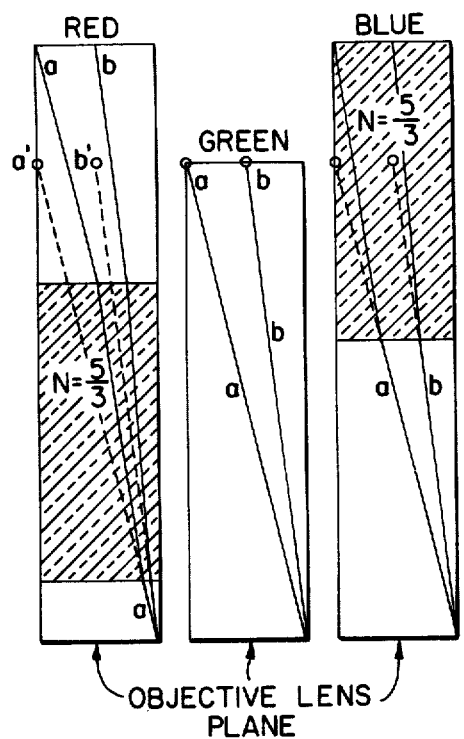
FIG._5.
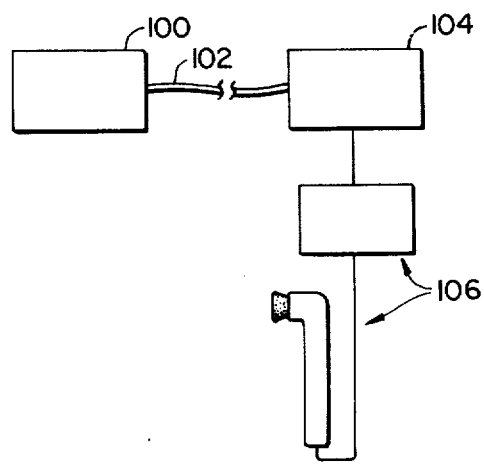
FIG._6.

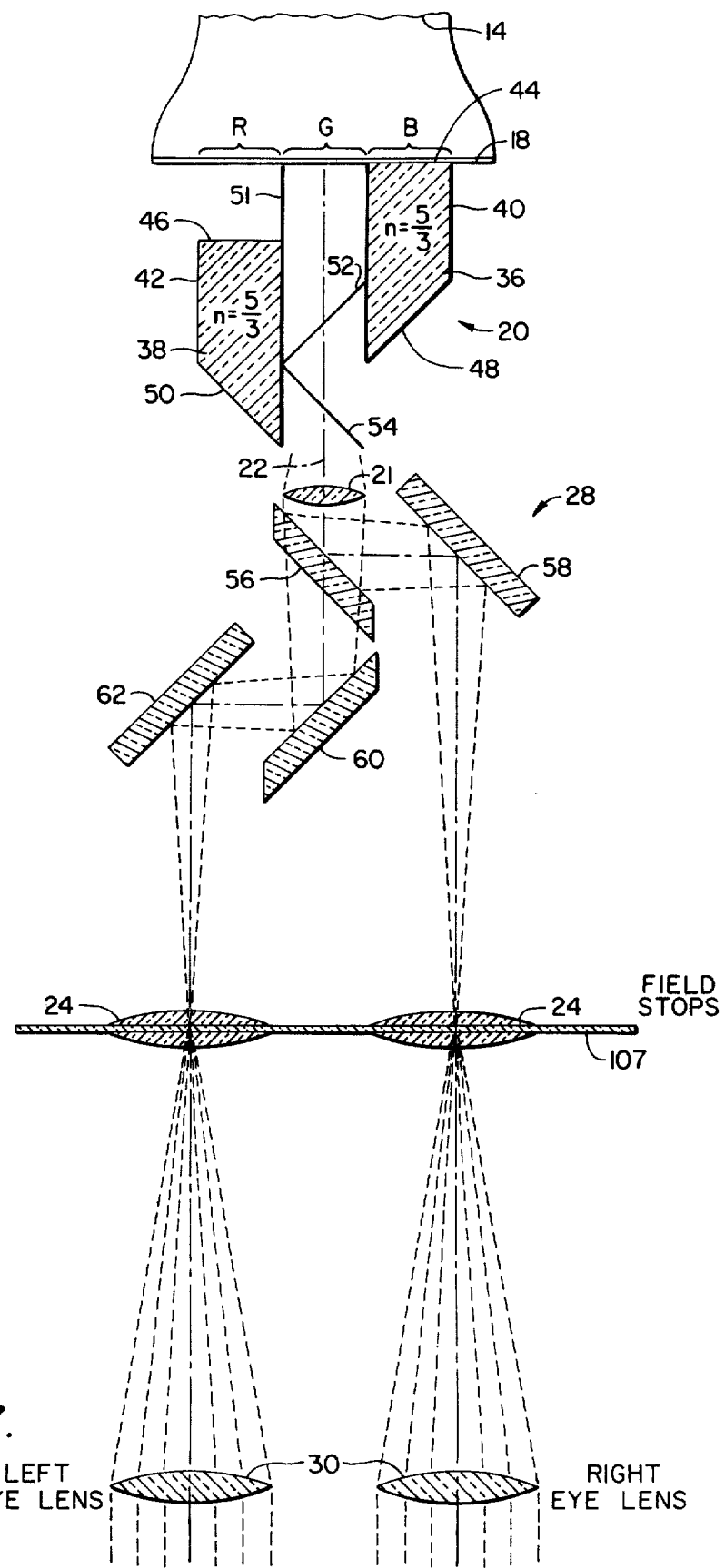
FIG._7.

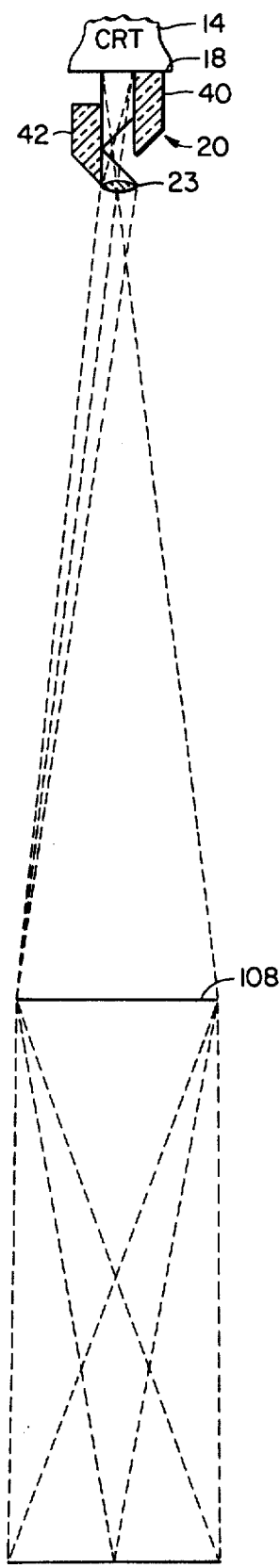
FIG._8.

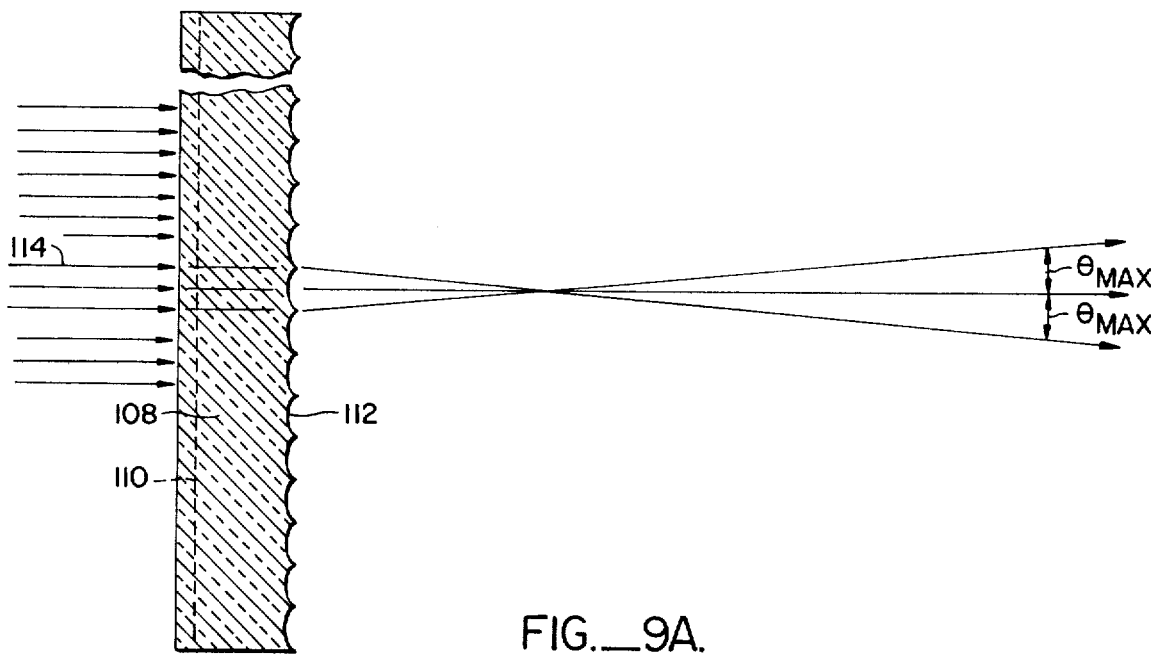
FIG._9A.
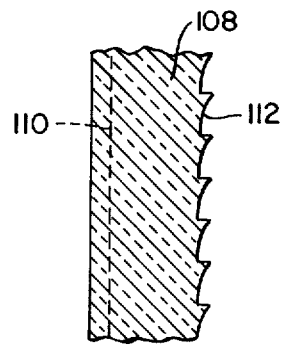
FIG._9B.

COLOR TELEVISION VIEWER

CROSS-REFERENCE TO RELATED APPLICATION

This application is a continuation-in-part of my co-pending application Ser. No. 056,035, filed July 9, 1979 and entitled COLOR TELEVISION VIEWER, now abandoned.

BACKGROUND OF THE INVENTION

This invention relates to a color television viewing device and, more particularly, to such a device which receives standard color television signals, reproduces separate color images from those signals, and optically recombines the signals into a composite colored image.

In the past, several different systems have been attempted which optically recombine separately displayed primary color pictures of a single scene. In such systems, the three primary colored pictures of the scene are presented on the face of a cathode ray tube. (See for example U.S. Pat. Nos. 2,552,464, 2,603,706 and 2,600,590). In all such systems, special television transmission systems or cameras must be used which are compatible with the viewing devices. Another common problem with such systems is that in optically recombining the three separate colored pictures, they are projected onto a screen. Screen projection both limits the size of the image and its intensity.

Some prior art optical recombining systems use a single objective lens to reduce both the cost of the system and the distance which is necessary between the objective lens and the display screen, but there is the problem of equalizing the distance of the optical paths between the objective lens and the display screen. If the optical path lengths are different, there will not be proper registration upon recombination of the images at the display screen. While attempts have been made to overcome this problem, they have not proved feasible where the cathode ray tube is operating from standard color television signals generated by commercially available cameras and transmitted through conventional television transmission networks. See for example U.S. Pat. No. 2,600,590 where the colored images are placed at equal distances from the objective lens in a radial arrangement with respect to the optical axis.

With conventional color television, which uses a standard color television cathode ray tube, there has been the problem that such devices must be of a relatively large size. One reason that this has been the case is that all color tubes now in commercial use are of the shadow mask type. Although there are different shadow mask techniques, it is extremely difficult with any of them to miniaturize the color tube for hand-held viewing use. One of the desirable advantages of a hand-held viewer is that the viewing screen can be viewed through a large diameter lens whose focal length is nearly equal to the distance between the lens and the tube face. The tube face will then appear to be greatly magnified in size and to be some distance away from the observer. The angular width (in radians) of the virtual image stays almost constant and equal to the linear width of the picture, i.e., the tube face, divided by the focal length of the lens as the image moves from a few feet away, to infinity. Small changes in the tube face distance make the virtual image of the television picture move from infinity into a few feet from the observer's eyes.

If the observer moves his or her head to the left or right, or up or down, the observer sees just the parallax that would be seen if the virtual image was a real object, and there was no lens in front of the observer's eyes. Secondly, the observer's convergence eye muscles that give stereo range-finding ability also tell the observer that the image is at its calculated position. Furthermore, if the observer is young, the observer's accommodation senses (cilliary muscles that change the shape of the eye lens) confirm that the virtual image is as distant as it is supposed to be. So, by all three tests (which the observer makes without thinking about them) the picture is big and faraway.

This is to be contrasted with moving a real image of a small television tube face over such a wide range of distances, focusing it always on a wide screen. In doing so, one would find that the apparent brightness of the image drops rapidly as the screen is moved away. Yet, when the virtual image of a small television screen is moved from being very close to the observer, all the way to infinity, its apparent brightness stays constant.

Another important consideration is the cathode ray beam "spot size" as measured as a function of the picture height. As the size of the picture tube gets smaller, the diameter of the spot must go down proportionally, if we demand that the vertical resolution in the picture does not degrade. However, if we want the same screen brightness, we need the same number of electrons hitting per unit area on the screen in a unit of time. Thus, when the spot size shrinks in area, the required beam current decreases as the picture height, squared. Conversely, if the beam current remains the same, the picture becomes brighter as the picture size shrinks in area. This analysis leaves out a number of parameters that influence screen brightness, but in general, it is easier to produce a high resolution, bright picture in a small size than it is in large sizes.

SUMMARY OF THE INVENTION

The above and other disadvantages of the prior art plural color imaging devices are overcome by the present invention of a television viewing apparatus for visually displaying color television signals on a hand-held screen. The apparatus comprises a television signal receiving circuit, which in the preferred embodiment, receives standard television signals, for simultaneously generating a plurality of separate, color video, scan line signals and raster scan cathode ray tube means for displaying a plurality of differently colored rasters side by side in the direction of line scanning. Serial delay line means separately sample and hold each video scan line signal from the television signal receiving circuit at one clock rate. The serial delay line means subsequently feed out the sampled and held signals at a faster clock rate to an electronic switch which sequentially samples all of the delay lines' outputs, in one line scan period, and then supplies the sampled outputs one at a time, to the cathode ray tube means for the display. The three colored rasters are presented in the primary colors of red, green and blue. These side-by-side, differently colored rasters are then optically combined into a composite, full color image.

In all of the preferred embodiments of the invention, the optical combining means comprise an objective lens, a plurality of blocks of transparent material, aligned with and spaced opposite certain of the side-by-side rasters and a plurality of dichroic mirrors arranged with the blocks in beam splitting fashion to combine the images along a single optical axis which passes through the objective lens. The indices of refraction of the plates and their spacing from the cathode ray tube display means are selected such that the optical path lengths from each of the rasters to the objective lens are equalized for the particular colors which are transmitted.

In one embodiment of the invention, the actual image which the observer perceives through a pair of eye pieces is a combined, composite, colored virtual image. In other embodiments, the composite image is projected onto a lightly diffusing screen, which is coincident with the field lens. One version has a special Fresnel lens surface to prevent a wide angle scattering of the light image. In this or in other alternative versions, the image is ultimately projected by the field lens onto a Fresnelled surface viewing screen.

In the preferred embodiment, the presentation of the three separate color displays is accomplished by means of separate pairs of serial delay lines for processing each color video scan line signal. While one delay line of each pair is sampling the color video scan line signal, the other delay line of the pair is playing out the color video signal at three times the sampling rate. An electronic switch samples each one of the output delay lines for each of the color video signals for about one-third of the scan line. In this way, the three complete rasters are presented nearly side by side in the direction of line scanning on the cathode ray tube display.

It is therefore an object of the present invention to provide a small, hand-held, color viewing apparatus which operates from color television signals of a selected standard.

It is another object of the invention to provide a low cost television in which a plurality of differently colored cathode ray tube rasters are optically combined into a single composite color image.

It is still another object of the invention to provide a hand-held color television viewing device which operates from standard broadcast-type color television signals.

It is yet another object of the invention to provide a low cost, hand-held color television viewing device.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is an illustration of a prior art method for optically combining separately colored television rasters;

FIG. 2 is a vertical view, partly in section, of a color television viewer according to the invention;

FIGS. 3 and 5 are optical diagrams for use in explaining the optical recombination mechanism according to the invention;

FIG. 4 is a block diagram depicting the electronic portion of the invention;

FIG. 6 is a diagrammatic view of a closed circuit color television system embodying the invention;

FIGS. 7 and 8 are optical diagrams for use in explaining two modifications to the invention;

FIGS. 9A and 9B are enlarged, vertical, sectional views of portions of the specially tailored field lens screen in the embodiment depicted in FIG. 8.

DETAILED DESCRIPTION OF CERTAIN PREFERRED EMBODIMENTS

Referring now more particularly to FIG. 2, the handheld television viewing apparatus 10 according to the invention is illustrated. The apparatus comprises a housing 12 which is in the form of an elongated, hollow tube. At the base of the housing 12 is positioned a cathode ray tube 14 together with magnetic deflection coils 16 and a phosphor display face 18. Abutting the face 18 are the recombination optics 20. As will be explained in greater detail in reference to FIG. 3, the recombination optics optically combine three separately colored, nearly side-by-side rasters into a single, composite colored image along the same optical axis 22 which passes through an objective lens 21. A binocular viewing assembly 28 divides the light leaving the objective lens 21 into two parts.

The divided parts of the light each pass through a separate one of a pair of field lenses 24 which are positioned perpendicular to the optical axis 22 in the housing 12. On the opposite side of the field lenses 24 from the cathode ray tube 14 are one or more 45° angled mirrors 26 which reflect the projected images through a pair of eye lenses 30 to be observed by the viewer (not shown). The overall length of the housing 12 is slightly more than sixteen inches. Its diameter is slightly more than two inches.

Referring now more particularly to FIGS. 1 and 3, in some prior art devices, such as U.S. Pat. No. 2,603,706 (Sleeper), three separately colored, side-by-side rasters are presented on the face of a cathode ray tube screen 18. The three raster images are the color component images of a full color picture which is being transmitted. The colored rasters are combined by three separate focusing lenses 32 onto a viewing screen 34 in the image plane. The three images, at the point where they impinge on the viewing screen, superimpose to form a composite colored image. One difficulty with a three lens system, however, is that it does require a diffusing screen.

To understand why a diffusing screen is required, it is convenient to reverse the direction of light rays hitting the eye of the observer. If one considers a white dot on the diffusing screen, one can trace three coincident rays from the pupil of the eye through the "eye lens" (if there is one), to the white spot on the diffusing screen. Although the "green" ray can continue backwards to its original direction, to hit the appropriate focussing lens 32, and then be deflected to hit the green spot on the green raster of the cathode ray tube face 18, the reversed red and blue rays must be changed appreciably in direction, at the screen, to miss the "green" lens, and pass through the appropriate red or blue lens, and then on to the red or blue spot on the cathode ray tube face 18. It should be apparent that in the scattering process at the diffusing screen, only a small fraction of the incident color rays will pass (purely by chance) through the correct lens. All other rays are useless, regardless of whether they hit the wrong lens, or some nearby area that contains no lens at all. In short, a diffusing screen is a bad waster of light.

Referring now more particularly to FIG. 3, the optical recombining mechanism of the invention is illustrated in detail. In operation, the applicant's television viewing apparatus optically combines the images of the three, nearly side-by-side, differently colored rasters along a single optical axis and then optically magnifies and beam splits the images to a pair of left and right field lenses and eye lenses to produce a full color virtual image which can appear as large as desired without losing any brightness. In the applicant's device, the red, green and blue (labeled R, G and B) rasters on the screen 18 are aligned with the recombining optics 20. The recombining optics comprise a pair of glass blocks 36 and 38, each having side faces 40 and 42 and each having one planar end face 44 and 46 which is plane parallel with the face of the cathode ray tube screen 18. The face 44 of the block 36 is aligned immediately adjacent and opposite to the blue raster (B) on the screen 18. The face 46 of block 38 is aligned with, but spaced apart from, the red (R) raster on the screen 18. The block 36 also has a face 48 which is opposite to the face 44 and which forms an angle of 45° with it. Since the axis 22 is perpendicular to the screen 18, the face 48 and the optical axis 22 subtend an angle of 45°. Similarly, the block 38 has a face 50 which forms an angle of 45° with the face 46 and also subtends an angle of 45° with the optical axis 22. A pair of spaced apart baffles 51 extend perpendicularly to the screen 18 to prevent light from each of the separate R, G and B rasters from entering into the fields of view of the others.

A first dichroic, plane mirror 52 is positioned to be plane-parallel with the surface 48 and to be symmetrically placed along the optical axis 22 in periscope fashion with the surface 48. It will be appreciated that light passing from the blue (B) raster through the face 44 and the slab 36 will be totally internally reflected at the face 48 to strike the mirror 52 and be projected along the optical axis 22. The dichroic mirror 52 is constructed such that it passes light of all wavelengths other than blue and that it reflects blue light.

Similarly, a dichroic, plane mirror 54 is positioned symmetrically along the optical axis 22. It is plane parallel with the surface 50 to act in periscope fashion for the light exiting from the slab 38 due to total internal reflection off the surface 50. The mirror 54 is constructed to pass light of all wavelengths other than red and to reflect red light. The glass slabs 36 and 38 are made of dense flint glass which has an index of refraction equal to 1.66.

Referring now to FIGS. 3 and 5, the operation of this portion of the recombining optics 20 is as follows: In order for the images of the red, green and blue rasters to be optically coincident at the viewing end of the optical system of the invention, it is necessary that the apparent distances of the three rasters, beyond the objective lens, as viewed along the three optical paths shown in FIGS. 3 and 5 be equal. The physical distance from the objective lens 21 to the green raster is 8 cm and the ("straightened out") physical distance to the red and blue rasters is 10 cm; there is a 2 cm transverse "jog" in the light paths to the two outside rasters, which are 2 cm wide. As will be explained further, the purpose of the two glass pieces 36 and 38 on either side of the central path 22 is to "shorten" the two outside light paths, from their actual 10 cm length, to an 8 cm apparent path length that will match the central green path, and ensure that the three rasters will appear to the viewer to coincide in space, and have identical linear dimensions.

The basic optical principle used in the design is that an object looked at through a plane-parallel slab of refracting material, of index n, and thickness t, appears to be closer than its actual position, by a distance, $d = t(1 - 1/n)$.

For the purposes of this optical system, it is important that the apparent decrease in the "depth" of a surface is independent of where the slab is placed along the optical path. Since the index of refraction changes with color, minor adjustments must be made in the glass thickness for the wavelength difference between the red and blue colors. From the formula for the image shift, we find that $d = (1 - 3/5)t$; $d = 0.4t$.

The two blocks of glass 36 and 38 each have 45° surfaces, 48 and 50, respectively, at which light rays will be totally internally reflected. If we measure the total path length in the glass (taking into account the 90° change in direction at the reflecting surface), we see that each block can be considered to have two plane-parallel surfaces, 5 cm apart; t = 5 cm. So, with the value of n = 5/3, d = 0.4 × 5 cm = 2 cm. Therefore, the equivalent path length from the objective lens 20 to the red and blue rasters is 10 cm − 2 cm = 8 cm, the same as the green path. Thus, the apparent path lengths traveled by all the images are equal to the objective lens, thereby allowing a completely coincident virtual image to be produced from a single objective lens.

In FIG. 5, two rays (a and b) are traced through the glass blocks, to show that the blocks really do move the rasters 2 cm closer to the objective lens, keeping the displaced rasters at the same linear size. The image is located (on the far side of the block), just the way one finds the distance to an object on the opposite bank of a river; by sighting on the object from various points on the near side, and solving some simple triangles (by trigonometry). The same thing is done in the case of the blocks; we sight the object from various points along the aperture of the objective lens 21, and use trigonometry to find where they intersect. The intersection point is where the object is. (For example, the six small circles—all 8 cm from the objective lens—mark the apparent positions of the three colored rasters in FIG. 5.) An examination of the diagram when drawn to scale, will show that the two outside rasters have been moved (optically) to positions 2 cm closer than their physical position, so they can be superimposed, optically, with the green raster, and with each other.

The distance between parallel planes containing objective lens 21 and the field lenses 24 is 160 mm. The distance from the field lenses 24 to the 90° bend made by the mirror 26 is 32 mm. The spacing between the optical centers of the field lenses 24 is 64 mm. The applicant has found that the optimum horizontal viewing angle is plus or minus 10° and that this figure sets the optical distance from the image plane to the plane of the two eye lenses 30. Each of the colored rasters in the preferred embodiment is approximately 2 cm wide. Upon optical magnification by the lenses 21 and 24, this image size is doubled to 4 cm. The path difference to the eye is 2 cm divided by the tangent of ten degrees which equals 11.3 cm. This makes the exit pupil (which is the image of the objective lens, formed by the field lens, at the plane of the eye) have a diameter of 2 cm × 11.3 cm divided by 16 cm which equals 1.41 cm.

In order to split the beam into equal parts, a beam splitter 56 is positioned between the field lens 24 and the objective lens 21 and aligned at 45° to the optical axis 22. Half of the image intensity will be reflected to a second mirror 58 which is aligned at 45° to the optical axis 22 to reflect the one-half portion of the image intensity to the right field lens 24 and the right eye lens 30.

The portion of the beam which is not deflected by the beam splitter 56 strikes another mirror 60 and is reflected to still another mirror 62 to pass through the left field lens 24 and exit from the left eye lens 30. The arrangement of the beam splitter 56 and the mirrors 58, 60 and 62 will be apparent to those skilled in the art, and exact dimensions of them will not be given.

In general, it is desirable that the left and right eye lenses 30 be spaced apart approximately 64 mm for the typical viewer. The unfolded optical path length should be 11.3 centimeters from the image plane and the image of the objective lens, formed by the field lens, at the plane of the eye, should be 1.41 cm in diameter.

The electronic circuit by which the three, separately colored rasters are presented side by side in the direction of line scanning on the face 18 of the cathode ray tube will now be described in reference to FIG. 4. Standard television signals, such as NTSC signals, are received by a television antenna, closed circuit television system, community television antenna network, or video tape recorder 64. These signals are then supplied to a state of the art color television receiver circuit 66. The color television receiver circuit is of the type which produces standard raster scan magnetic deflection signals for the magnetic deflection coils 16 of the cathode ray tube 14 and also produces separate and complete video signals rather than the combination of luminance and chrominance signals normally generated in color TV receivers.

In the present invention, however, the cathode ray tube 14, is specially constructed to have a display screen 18 with three, separate phosphor bands which will each produce a different color when bombarded by an electron beam. Since the details of construction of such a tube are known to those skilled in the art, (see for example U.S. Pat. No. 2,337,980), the construction of the tube 14 will not be described in greater detail other than to say that it has a single electron gun and a single electron beam control element (not shown). Because the tube 14 does not have to be of the shadow mask type, it can be made quite small without costly manufacturing techniques. The magnetic deflection apparatus 16 for the cathode ray tube is also state of the art and will therefore not be described further.

The red, green and blue color video signals produced by the television receiver circuits 66, and denoted R,G,B in FIG. 4, respectively, are supplied to separate pole terminals of a three pole, double throw, electronic switch 68. It will be appreciated that while the various switches depicted in FIG. 4 are shown in mechanical form, they are actually constructed as electronic switches of the type well known to those skilled in the art.

The outputs of the switch 68 are supplied to three pairs of serial delay lines 70, 72, 74, 76, 78 and 80. Thus, the B video signal is supplied alternately either to the serial delay lines 70 or 72, the G signal is supplied alternately either to the serial delay lines 74 or 76, and the R video signal is supplied alternately to either the serial delay lines 78 or 80. The color video signals enter the serial delay lines through separate input ports. The serial delay lines are preferably electrically variable analog delay lines of the charged coupled device type. Such devices are well known to those skilled in the art, (see for example U.S. Pat. No. 3,546,490), and, therefore, will not be described in greater detail. With such a device, it is possible to write in a signal at one rate and, after it has been completely written in, to read it out at a different rate which may be either faster or slower than the writing or sampling rate.

In the present embodiment, the writing rate is controlled by a single pole, double throw electronic switch 84, connected to a "standard rate" clock pulse generator 86. The clock pulse generator 86 is supplied with the color sub-carrier signal (3.579545 MHz) from the color television receiver circuit 66. In the preferred embodiment, the clock pulse generator 86 generates clock pulses at twice this frequency. The pulses from the generator 86 are supplied through the switch 84 alternately to the clock terminals of the delay lines 70, 74, and 78 or delay lines 72, 76 and 80. The periods during which these clock pulses are supplied by the switch 84 is controlled by a square wave generator 88 which is supplied with the horizontal synchronization pulse (15,750 Hz) from the color television receiver circuit 66. The square wave output from the generator 88 has a period (2T) of 127 microseconds, that is twice the normal line scanning period (T) for a color television receiver. Thus the pole arm of the switch 84 is connected to the clock terminals of the delay lines 70, 74 and 78 during one line scanning period and is then connected to clock terminals of the delay lines 72, 76 and 80 during the next succeeding line period.

The clock terminals of the delay lines 70, 74 and 78 are connected in succession to three separate contacts of a three position rotary, electronic switch 82. Similarly, the clock terminals of the serial delay lines 72, 76 and 80 are connected in succession to separate contacts of a rotary, electronic switch 83. These clock terminal inputs connected to the switches 82 and 83, respectively, are isolated by internal diodes (not shown) from the clock inputs connected to the switch 84. The isolating diodes are necessary to allow each of the respective delay lines to be separately addressed on readout. The moving contacts of the switches 82 and 83 are connected to separate contacts of a single pole, double throw electronic switch 90, whose pole contact is connected to the output of a triple rate clock 92. The pole contact of the switch 90 is synchronized to move with the contact of the switch 84.

The triple rate clock 92 supplies pulses at three times the clock pulse rate of the standard rate clock 86 to which it is connected. In operation, while the switch 84 is supplying standard rate, writing clock pulses to the clock terminals of the delay lines 70, 74 and 78, the switches 90 and 83 are supplying triple rate reading clock pulses to each of the clock terminals of the delay lines 72, 76 and 80 in succession. During the next horizontal line scanning period, while the switch 84 is supplying standard rate writing clock pulses to the clock terminals of the delay lines 72, 76 and 80, the switches 90 and 82 are supplying the triple rate, reading clock pulses to each of the clock terminals of the delay lines 70, 74 and 78 in succession.

The video outputs of the serial delay lines are connected in common, by pairs, to separate contacts of a rotary type, electronic switch 94, i.e., the outputs of the serial delay lines 70 and 72 are connected in common to the first contact of switch 94, the outputs of the serial delay lines 74 and 76 are connected in common to the next contact in succession and the outputs of the serial delay lines 78 and 80 are connected in common to the third contact of the switch 94. The pole contact of the switch 94 is connected to the control element of the cathode ray tube 14 and is operated by a one-third T pulse generator 96. The pulse generator 96, triggered by the horizontal synchronization pulse from the receiver 66, generates three pulses during each horizontal line scan period so that the switch 94 sequentially samples each of the contacts supplied with the red, green and blue video signals for nearly one-third of the line scan period. The pole contacts of the switches 82 and 83 are synchronized to rotate with the pole contact of the switch 94 so that one of the switches 82 or 83 is positioned to supply triple rate clock pulses to the output clock terminal of whichever of the serial delay lines is then being sampled by the switch 94.

Since the video signals are outputted from the delay lines at three times the rate at which they were stored, the net result of the sampling by the switch 94 is that substantially the first third of the horizontal line scan on the face of the cathode ray tube screen 18 will be the red video information, the next third will be the green video information, and the last third will be the blue video information. Red, green and blue rasters will thus be presented nearly side by side for an entire frame of scanning. In order that the rasters will have the same configuration as the standard color television raster the magnitude of the horizontal deflection magnetic field or voltage, depending on the type of deflection system used, is increased so that the horizontal scan will traverse three times its normal distance across the cathode ray tube screen 18 but in the standard horizontal scan line period of 63.5 microseconds.

To summarize the operation of the circuit depicted in FIG. 4, beginning with the first horizontal scan line received, that is to be presented on the face of the cathode ray tube approximately T seconds later, the red, green and blue video information will be stored in the serial delay lines 70, 74 and 78 respectively, at the standard clock rate (which is approximately double the color sub-carrier frequency). During the reception and storage of the next horizontal scan line, the switch 68 will supply the red, green and blue video signals to the serial delay lines 72, 76 and 80, where they will be stored at the standard clock rate. Simultaneously with storing of the second scan line of video information, the first scan line of video information for each color will be outputted, in succession, from the serial delay lines 70, 74 and 78 at three times the normal clock rate through the sampling switch 94 to the control element of the cathode ray tube 14.

Thus, by use of the serial delay lines' ability to sample video information at one rate and read it out at a faster rate, the circuit of the invention effectively converts video information received in a time-parallel form to a time-serial form. In this time-serial form, the video information can be used by a conventional black and white type of raster scan display system if colored filters are placed over the three side-by-side rasters. But the preferred embodiment employs a tri-color banded phosphor screen to simultaneously present three side-by-side rasters in the three primary colors. These separate, colored images are then optically combined, using a single objective lens, to produce a full color, real image, which is then viewed through an eye lens, to produce a greatly enlarged virtual image, in full color.

It should also be noted that this system is particularly applicable to very high resolution color pictures, because its resolution is not limited by the structure of the universally used shadow mask tubes. In effect, a shadow mask tube has some of the properties of a halftone screen, and as is well known, the resolution of a photograph is degraded when it is reproduced by a halftone printing process. The system described above permits much higher resolution color pictures to be produced than is possible in state of the art shadow mask tubes.

Furthermore, with the advent of glass fibers as exceedingly wideband transmission systems—150-200 MHz is easy to achieve—one can implement very high resolution (and therefore wide band) television systems that could only be dreamed about when the NTSC and SECAM standards were set. Referring to FIG. 6, for example, it is now state of the art to make a flying spot film scanner 100, at low cost, to generate such wideband signals. These signals can be transmitted as modulated light beams over a fiber-optic bundle 102 to a demodulator 104 which produces corresponding color video signals, in a manner known per se, which are fed to a viewing device 106 according to the invention to reproduce them in a non-degraded manner. By operating over a closed tranmission system, unnecessarily limiting governmental broadcast standards can be avoided.

Referring now more paritcularly to FIG. 7 a modification to the system depicted in FIG. 3 is shown in which the diameter of the two exit pupils that emerged from the eye lenses 30 is expanded. In this device, a light diffusing, ground glass screen 107 is interposed in the central plane of the field lenses 24 so that the combined images from the binocular optics are formed in coincidence with the screen 107. This causes light to be scattered into a considerably larger exit pupil than that depicted in FIG. 3 in which the unscattered rays continued to the eye lenses. The light diffusing screen 107 diffuses the light rays so that the maximum scattering angle is only several degrees rather than the 90 degrees or so which is used in slide projector or back-projection type screens.

This causes the light photons from the combined image to be spread over two circles, each with a diameter of approximately 5 cm so that the person using the viewer will not be conscious of the fact that he or she is looking through peepholes having a diameter of 1.41 cm approximately, but rather is looking anywhere he or she wants to inside of the wide entrance port of the viewer. As will be mentioned further in respect to the modification depicted in FIG. 8, Fresnel lenses can be substituted for the ordinary eye lenses 30 and the whole viewing areas can be covered by a single piece of plastic into which two side-by-side Fresnel lenses are molded, each with a focal length equal to the distance from the image (field stop) to the eye lens. This puts two virtual images at infinity and for most viewers the two images will appear to coincide at infinity with the three indicators mentioned above in this application all telling the observer that the image is really enormous and very far away.

Referring now more particularly to FIG. 8, still another modification of the light combining optics of the invention is illustrated. In this modification, the binocular viewing apparatus 28 is omitted and the combined images are focussed onto a specially designed screen 108 by means of a projection lens 23.

The purpose of the screen 108 is fundamentally similar to that of the familiar back-projection screen. Light photons that are brought to a focus at the plane of the screen are scattered at the screen so that they cover a larger solid angle after striking the screen than they occupied on their way from the projection lens to the screen. In an ordinary projection screen, the scattered light covers most of a hemisphere beyond the screen, so that viewers situated at many places can see the image focussed on the screen. In the modification to be described, we want the screen to have scattering properties intermediate between those of a normal back projection screen and the system shown in FIG. 7, when the scattering angle is only a few times greater than the width of the incident cone of light, from the projection lens to the scattering screen(s).

The advantage of this modification is that the viewer can be far enough away from the screen so that he or she can easily focus on it without needing the eye lenses that are shown in FIGS. 3 and 7. If the screen is at a "comfortable reading distance" of 16 inches, no special eye lenses are required. The user can see the screen clearly without any intervening lenses, of if any are required, they will be in the form of ordinary spectacles, worn by the user. But to keep the apparent angular width of the screen at the desired ±10°, the screen will be 5.6 inches wide, rather than the 4 cm (1.57 inches) shown in FIGS. 3 and 7. Since the screen is to be viewed by only one user, we can eliminate the light scattered by a normal back projection screen into those parts of a plane, 16 inches from the screen, that will never be occupied by the user's eyes. That design condition permits the image to be much brighter than would normally be possible with a back projection screen. The designer can set any area of the plane at the viewing distance to be illuminated at the maximum available brightness, and then design the properties of the screen to achieve that illumination pattern. It has been shown that the smaller the illuminated area, the brighter the image, so the designer must make a compromise between brightness, and the need for the user's head to be exactly in the same place, all the time he or she watches the screen.

No standards are available in this matter, but one can benefit by remembering that persons driving an automobile are not bothered by keeping their head centered with respect to the entrance pupil of their rear view mirror system, which is about 2 inches high and 6 inches wide. Therefore, in what follows, the screen will be designed so that light focussed on any part of the screen will be scattered in a controlled way so that equal numbers of photons from that spot on the screen hit all parts of an ellipse at 16 inches from the screen, that has a major horizontal axis of 6 inches, and a minor vertical axis of 2 inches. The user will then be able to see all parts of the screen with the same intensity, if his eyes are anywhere in that ellipse. It should be noted that in this modification, the user views a real image, rather than a virtual image.

The design specifications have now been set down, and in what follows, a method of achieiving those specifications is outlined. The screen 108 is a specially contoured Fresnelled field lens with a pitch so fine that the user can't see the individual lines. With reference to FIGS. 8, 9A and 9B, the face of the screen 108 directed towards the lens 21 is provided with a plurality of parallel, linear, semi-cylindrical, concave or convex lens elements 110. The lens elements 110 are oriented to project out of the plane of FIG. 8 and lie parallel to the planes of FIGS. 9A and 9B. The back side of the screen 108 is provided with a plurality of semi-cylindrical, parallel, linear, concave or convex lens elements 112 which are at right angles to the elements 110. FIG. 9A shows the geometry of both the horizontal and vertical lens elements near the center of the screen where the grooves are more or less symmetrical. At the edges of the screen the grooves, both horizontal and vertical, are more tilted as depicted in FIG. 9B, to act as a combination of field lens and controlled scatterer.

The horizontal lens elements are designed to spread the incoming light rays uniformly through vertical angles that have a maximum value of $6.25 \times 10^{-2}$ radians, and the vertical elements are designed to do the same spreading, horizontally, through angles up to $1.88 \times 10^{-1}$ radians. The maximum widths of the lens elements, to be invisible, should have an angular width of about one minute of arc as seen by the observer. At an observing distance of 16 inches this means that they have a width of 0.0047 inches. The elements are narrow enough that they will spread out the light by diffraction but that is not a significant effect. The characteristic diffraction angle is always $\theta = \lambda/a$, where $\theta$ is in radians, $\lambda$ is the wavelength in any units, and $a$ is the groove width in the same units. If we take $a = 4.7 \times 10^{-3}$ inches, and $\lambda = 2 \times 10^{-5}$ inches, we find $\theta = 4.3 \times 10^{-3}$ radians. At a 41 cm viewing distance, such an angle spreads a bundle of rays over a circle with a diameter of $41\theta = 0.176$ cm. Since this diameter is small compared to the 2 cm diameter that results from the finite aperture of the objective lens, diffractive effects can be neglected. The net effect of the screen 108 is to distribute the incoming rays over a 6 inch by 1 inch ellipse. Outside of a boundary layer of approximately a little less than one inch the intensity falls from a uniform plateau value to zero. This boundary layer corresponds in width to the diameter of the exit pupil.

With reference to the electronic circuit depicted in FIG. 4, the degree of sweep linearity required to make the three colored rasters coincide well enough to give high resolution is not a significant problem. This is because of the very small deflection angles used in the cathode ray tube. In a modified embodiment, however, to further ensure sweep linearity the electron beam can be deflected through, for example, plus and minus 20 degrees, and only the central (and more linear) portion of plus or minus 10 degrees can be used. To do this the information is read out at 6 times the input rate and the first and last quarter of the scanning line time is not used in the display mode. An alternative approach is to compensate for any non-linearities in the sweep. In the second alternative each cathode ray tube unit produced has a counter and a special read only memory. The read only memory has numbers stored in it to tell the counter, when it reaches each such number, that it should instruct the read out clock to fail to pass its corresponding pulse or pulses to the serial delay line. This stops the delay line from feeding the information to the grid of the CRT until the slower sweep has caught up to where it should be, to display the next bits of information.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A television viewing apparatus for visually displaying color television signals of a standard type, comprising, a television signal receiving circuit supplied with a television signal of a selected standard for simultaneously generating a plurality of separate, scan line color video signals, raster scan, cathode ray tube means for displaying a plurality of differently colored rasters side by side in the direction of horizontal line scanning, serial delay line means for separately sampling and holding each scan line color video signal, one scan line at a time, at one clock rate and subsequently outputting the sampled and held signal at a second, faster clock rate, switch means for sampling in succession, all of the delay lines' outputs in one, horizontal line scan period and for supplying the sampled outputs to the cathode ray tube means for display, means for optically combining the side-by-side rasters into a composite, full color image.

2. Television signal viewing apparatus as recited in claim 1 wherein the ratio of the second clock rate to the first clock rate is equal to the number of separate color video scan line signals which are simultaneously generated by the receiving means.

3. Television signal viewing apparatus comprising circuit means for receiving a color television signal and for simultaneously generating a plurality of separate color information, video line scan signals, raster scan, cathode ray tube display means for displaying a plurality of rasters in different colors nearly side by side in the direction of line scanning, separate serial delay means connected to the receiving means, for simultaneously sampling and holding each of the color information video scan line signals, one scan line at-a-time at a first clock pulse rate while outputting in succession, each of the next previously sampled and held video scan line signals at a second, higher clock pulse rate, electronic switch means for connecting the display means sequentially to each of the delay means so that the output of each delay means is supplied one at-a-time to display means during one line scan period, and means for optically combining the side-by-side colored rasters into a single image.

4. A color television signal viewing apparatus as recited in claim 1 wherein the optical combining means comprise an objective lens, a plurality of pieces of transparent material, each having faces which are aligned with and spaced from certain ones of the side-by-side rasters and a plurality of dichroic mirrors arranged with the transparent pieces in beam splitting fashion to combine the images passing through the pieces along a single optical axis which passes through the objective lens, the index of refraction of the transparent pieces, their lengths and their displacements from the optical axis being selected such that the apparent optical path lengths from each of the rasters to the objective lens are the same for the colors that are transmitted.

5. A color television signal viewing apparatus as recited in claim 4 wherein the optical combining means produce a combined, composite colored, virtual image.

6. Television signal viewing apparatus as recited in claim 4 further comprising an elongated handle for housing the cathode ray tube display and the optical combining means.

7. A color television signal viewing apparatus as recited in claims 3 or 4 wherein the optical combining means produce a combined, composite colored, real image.

8. A television viewing apparatus as recited in claim 1 or 3 wherein the television signal receiving circuit is supplied with NTSC standard television signals.

9. A television viewing apparatus as recited in claim 1 or 3 wherein the television signal receiving circuit is supplied with the SECAM or PAL standard television signals.

10. A television viewing apparatus as recited in claim 1 or 3 wherein the television signal receiving circuit is supplied with special purpose television signals with a band width much greater than those now used in color television.

11. Television signal viewing apparatus as recited in claim 3 wherein the optical combining means produce a combined, composite colored, virtual image.

12. Television signal viewing apparatus as recited in claim 3 wherein the optical combining means comprise an objective lens, a plurality of transparent blocks aligned with and spaced opposite from certain ones of the side-by-side rasters and a plurality of dichroic mirrors arranged with the blocks in beam splitting fashion to combine the images along a single optical axis which passes through the objective lens, the index of refraction of the blocks, their lengths, and their spacing being selected such that the apparent optical path lengths from each of the rasters to the objective lens are the same for the colors that are transmitted.

13. Television signal viewing apparatus as recited in claim 3 or 12 wherein the optical combining means include binocular viewing means.

14. Television signal viewing apparatus as recited in claim 3 wherein the ratio of the second clock pulse rate to the first clock pulse rate is equal to the number of separate color information video scan line signals which are simultaneously generated by the receiving means.

15. In combination with the television viewing apparatus recited in claims 1 or 3, means for generating wideband color television signals, means for transmitting said signals over a closed circuit transmission system to the television signal receiving circuit of the viewing apparatus whereby a color television image is reproduced in a non-degraded manner.

16. The combination as recited in claim 15 wherein the television signal generating means generates signals in the range of 150 to 200 MHz.

17. The combination as recited in claim 15 wherein the closed circuit transmission system comprises a fiber-optic cable and the television signal generating means generate video signal modulated light signals.

18. Television signal viewing apparatus for visually displaying color television signals of a standard type comprising circuit means for receiving a color television signal and for simultaneously generating a plurality of separate color information, video line scan signals, raster scan display means supplied with the video scan line signals for displaying a plurality of rasters in different colors aligned side by side, in the direction of line scanning, means for optically combining the side-by-side rasters into a composite color image along a single optical axis, the optical combining means including an objective lens symmetrically positioned on the optical axis and perpendicular to it, means interposed between the display means and the objective lens for optically adjusting the apparent optical path lengths from each of the rasters to the objective lens to be the same for the colors that are displayed, and a limited, light diverging screen onto which the composite color image is projected by the objective lens.

19. Television signal viewing apparatus as recited in claim 18 wherein the screen scatters incident light rays over angles less than 20°.

20. Television signal viewing apparatus as recited in claim 18 wherein the optical combining means further include at least one field lens aligned with the objective lens and having a central plane of symmetry, and wherein the screen bisects the field lens and is parallel to the central plane of the lens.

21. Television signal viewing apparatus as recited in claim 18 wherein the screen is positioned perpendicular to the optical axis and includes at least one Fresnel field lens surface on the screen to control the amount of light divergence produced by the screen.

22. Television signal viewing apparatus as recited in claim 21 wherein the screen has a pair of parallel plane Fresnel lenses, each of which is composed of a plurality of parallel, straight line elements, and with the elements of one lens oriented orthogonally with respect to the lens element of the other lens.

23. Television viewing apparatus as recited in claim 22 wherein the straight elements have a maximum width of 1 minute of arc as seen by the viewer.

24. Television signal viewing apparatus as recited in claim 22 wherein the screen redirects incident light in a elliptical pattern.

25. Television viewing apparatus as recited in claim 24 wherein the screen redirects incident light rays uniformly through maximum angles of $6.25 \times 10^{-2}$ radians in a vertical direction and $1.88 \times 10^{-1}$ radians in a horizontal direction.

26. Television viewing apparatus as recited in claim 20 or 21 further comprising a planar viewing screen onto which the composite color image is focused by the field lens, the viewing screen having a Fresnel lens covering its viewing surface and the lens having a predetermined focal length equal to the distance from the viewer to the field lens.

* * * * *